US012759374B2

(12) United States Patent
Park et al.

(10) Patent No.: US 12,759,374 B2
(45) Date of Patent: Oct. 13, 2026

(54) ELECTRIC COMPRESSOR FOR VEHICLE

(71) Applicant: ESTRA AUTOMOTIVE SYSTEMS CO., LTD., Daegu (KR)

(72) Inventors: Jin Woo Park, Daegu (KR); Ho Young Jang, Daegu (KR); Doe Hyung Lee, Daegu (KR); Sung Won Kang, Daegu (KR); Dong Yeon Kim, Daegu (KR); Seong Yeob Lee, Daegu (KR); Kwang Woo Nam, Daegu (KR)

(73) Assignee: ESTRA AUTOMOTIVE SYSTEMS CO., LTD., Daegu (KR)

( * ) Notice: Subject to any disclaimer, the term of this patent is extended or adjusted under 35 U.S.C. 154(b) by 119 days.

(21) Appl. No.: 18/712,137

(22) PCT Filed: Nov. 22, 2022

(86) PCT No.: PCT/KR2022/018451
§ 371 (c)(1),
(2) Date: May 22, 2024

(87) PCT Pub. No.: WO2023/096292
PCT Pub. Date: Jun. 1, 2023

(65) Prior Publication Data
US 2025/0033436 A1 Jan. 30, 2025

(30) Foreign Application Priority Data
Nov. 24, 2021 (KR) ........................ 10-2021-0163314

(51) Int. Cl.
*B60H 1/32* (2006.01)
*B60H 1/00* (2006.01)

(52) U.S. Cl.
CPC ....... *B60H 1/3205* (2013.01); *B60H 1/00885* (2013.01)

(58) Field of Classification Search
CPC .............. B60H 1/3205; B60H 1/00885; B60H 1/00392; B60H 1/00921; B60H 1/22; B60H 1/32
See application file for complete search history.

(56) References Cited

U.S. PATENT DOCUMENTS 5,572,877 A * 11/1996 Ikeda ................. B60H 1/00821 62/155
5,634,348 A * 6/1997 Ikeda ...................... F24F 3/153 62/229
(Continued)

FOREIGN PATENT DOCUMENTS

JP 09-272333 A 10/1997
JP 11-301246 A 11/1999
(Continued)

*Primary Examiner* — Nelson J Nieves
(74) *Attorney, Agent, or Firm* — You & IP, LLC

(57) ABSTRACT

Proposed is an electric vehicle air conditioning system and a control method therefor, the air conditioning system being capable of preventing a phenomenon in which flash fogging occurs on a windshield. The method for the electric vehicle air conditioning system includes determining whether a current air conditioning mode is set to a cooling mode or a heating mode, determining whether a request for entering an internal heat exchanger dry mode is received when the current air conditioning mode is set to the heating mode, entering the internal heat exchanger dry mode and performing an drying operation of an internal heat exchanger for a predetermined time when the request for entering the internal heat exchanger dry mode is received, and operating a set normal heating mode when the internal heat exchanger dry mode is finished.

9 Claims, 6 Drawing Sheets

(56) References Cited

U.S. PATENT DOCUMENTS

| | | | | |
|---|---|---|---|---|
| 5,899,082 | A * | 5/1999 | Stein | B60H 1/00828 62/282 |
| 6,658,871 | B1 * | 12/2003 | Stein | B60H 3/0085 62/282 |
| 2003/0217833 | A1 * | 11/2003 | Alber | B60H 3/024 62/275 |
| 2010/0175406 | A1 * | 7/2010 | Wankhede | B60H 1/32331 62/285 |
| 2013/0333396 | A1 * | 12/2013 | Handley | B60H 1/3202 62/48.1 |
| 2017/0028813 | A1 * | 2/2017 | Enomoto | B60H 1/08 |

FOREIGN PATENT DOCUMENTS

| | | | |
|---|---|---|---|
| JP | 2002-200917 | A | 7/2002 |
| JP | 2005-059760 | A | 3/2005 |
| JP | 2011-68156 | A | 4/2011 |
| KR | 10-2007-0039282 | A | 4/2007 |
| KR | 10-2014-0113062 | A | 9/2014 |
| KR | 10-2020-0062905 | A | 6/2020 |
| KR | 10-2183499 | B1 | 11/2020 |

* cited by examiner

ELECTRIC COMPRESSOR FOR VEHICLE

TECHNICAL FIELD

The present disclosure relates to an electric vehicle air conditioning system and a control method therefor. More particularly, the present disclosure relates to an electric vehicle air conditioning system and a control method therefor, the electric vehicle air conditioning system being capable of preventing a phenomenon in which flash fogging occurs on a windshield, the flash fogging occurring when moisture stored in an internal heat exchanger is evaporated since an air conditioning system in which a 4-way valve is applied is switched from a cooling mode to a heating mode and then the internal heat exchanger functioning as an evaporator is changed to function as a condenser.

BACKGROUND ART

As is already known, an air conditioning system for controlling an air temperature in an indoor of a vehicle is provided inside the vehicle. Such an air conditioning system for a vehicle generates a warm air in the winter so that the indoor is kept warm, and generates a cold air in the summer so that the indoor is kept cool.

In a general air conditioning system for a vehicle, a compressor, a condenser, an expansion valve, and an evaporator are sequentially connected to each other by a refrigerant pipe, and the refrigerant is circulated as the compressor is driven by a power of an engine. In such an air conditioning system for the vehicle, a refrigerant gas compressed at a high temperature and a high pressure in the compressor passes through the condenser and heat exchange between the refrigerant gas and surrounding air is performed, so that the refrigerant gas is converted into the refrigerant in a liquid state. Furthermore, the liquefied refrigerant passes through a receiver dryer connected to the condenser and impurities in the liquefied refrigerant are removed, and then passes through the expansion valve and is changed into the refrigerant in a gaseous state at a low temperature. In addition, when the low temperature refrigerant that is vaporized passes through the evaporator, heat exchange between the refrigerant and surrounding air is performed and the refrigerant is cooled, and cooled air is discharged to the interior of the vehicle by a blower. Then, the refrigerant in the gaseous state having the low temperature and passing through the evaporator is sent back to the compressor, and the refrigerant is repeatedly circulated through a process of being compressed at a high temperature and a high pressure.

Meanwhile, recently, an electric vehicle using electric energy as a power source has been released. As an air conditioning system mounted in such an electric vehicle is configured to heat water or air through a power source supplied from a battery, there is a disadvantage that the power performance of the electric vehicle is significantly reduced.

Accordingly, similar to an existing internal combustion engine vehicle, a heat pump system is applied to an air conditioning system of an electric vehicle. Such a heat pump system is a combined cooling and heating system in which a cycle having compression, condensation, decompression, and evaporation of a refrigerant is reversibly applied.

That is, since the heat pump system has a cycle in which the liquid refrigerant evaporates inside the evaporator, the liquid refrigerant becomes in a gaseous state by absorbing heat from the surrounding area, and the gaseous refrigerant is liquefied while discharging heat from the surrounding area in the condenser. Therefore, when the liquid refrigerant is applied to an electric vehicle or a hybrid vehicle, there is an advantage that a heat source insufficient to the existing air conditioning system may be secured.

In a conventional air conditioning system for an electric vehicle in which the heat pump system is applied, a portion of a refrigerant circuit is piped to an evaporator provided inside a Heating Ventilation Air Conditioning System (HVAC) module positioned inside the vehicle, and cooling air is secured through heat exchange between the refrigerant of the evaporator and air that moves around the evaporator.

However, in such a conventional air conditioning system for the electric vehicle in which the heat pump system is applied, when the air conditioning system is operated in a cooling mode and then is changed to a heating mode, an internal heat exchanger that was functioning as an evaporator is changed to function as a condenser, and a problem of flash fogging in which water droplets (moisture) that were stored in the internal heat exchanger are evaporated and are formed on the windshield occurs. Therefore, it is difficult to find a case in an electric vehicle in which a heat pump system using a 4-way valve is applied.

That is, a heat pump system in which a 4-way valve capable of guiding a flow of a refrigerant in a specific direction through control is applied is a basic heat pump system widely used for domestic and industrial purposes. However, in a situation in which the heat pump system using the 4-way valve is applied to a passenger vehicle, when the air conditioning mode is operated in the cooling mode and then the air conditioning mode is changed to the heating mode due to a manipulation of a driver or other set conditions, the internal heat exchanger that was functioning as an evaporator is changed to function as a condenser, and moisture that is stored in the internal heat exchanger while the internal heat exchanger is in an evaporator state is evaporated and a flash fogging phenomenon in which the moisture forms like a fog on the windshield of the vehicle occurs.

As described above, in the heat pump system in which the 4-way valve is applied, the flash fogging that occurs when the air conditioning mode is changed from the cooling mode to the heating mode is not a big problem when the heat pump system is used for domestic use or industrial use. However, when the heat pump system in which the 4-way valve is applied is mounted and used in a vehicle, the flash fogging occurs on the windshield of the vehicle that is driving, and the visibility of a vehicle driver is blocked, and a serious problem that may cause a safety accident may occur. Accordingly, a new method that can suppress flash fogging that occurs on the windshield of the vehicle while the heat pump system in which the 4-way valve is applied is urgently required.

Document of Related Art (Patent Document 1) Korean Patent Application Publication No. 2007-0039282 (Apr. 11, 2007)

DISCLOSURE

Technical Problem

Accordingly, the present disclosure has been made keeping in mind the above problems occurring in the related art, and an objective of the present disclosure is to provide an electric vehicle air conditioning system and a control method therefor, the electric vehicle air conditioning system being capable of preventing a flash fogging phenomenon that occurs on a windshield, the flash fogging occurring when moisture stored in an internal heat exchanger is evaporated since an air conditioning system in which a 4-way valve is applied is switched from a cooling mode to a heating mode and then the internal heat exchanger functioning as an evaporator is changed to function as a condenser.

Technical Solution

In order to solve the technical problem described above, according to the present disclosure, there is provided a control method for an electric vehicle air conditioning system, the control method including: (a) determining whether a current air conditioning mode is set to a cooling mode or a heating mode; (b) determining whether a request for entering an internal heat exchanger dry mode is received when the current air conditioning mode is set to the heating mode; (c) entering the internal heat exchanger dry mode and performing an drying operation of an internal heat exchanger for a predetermined time when the request for entering the internal heat exchanger dry mode is received; and (d) operating a set normal heating mode when the internal heat exchanger dry mode is finished.

Here, after the entering of the internal heat exchanger dry mode of the process (c), a heater core and a blower fan inside a HVAC module may be operated for a predetermined time in a first stage so that dehumidification of the internal heat exchanger and indoor heating are performed, and a compressor may be operated at a set minimum RPM for a predetermined time in a second stage so that residual moisture of the internal heat exchanger is removed.

In addition, the control method may further include (a-1) determining whether an outside temperature exists within a set range when it is confirmed that the current air conditioning mode is set to the heating mode in the process (a).

In addition, in the process (a-1), when the outside temperature exists within the set range, the electric vehicle air conditioning system may enter the process (b) and whether the request for entering the internal heat exchanger dry mode is received may be determined, and when the outside temperature does not exist within the set range, the electric vehicle air conditioning system may enter the process (d) and the set normal heating mode may be operated.

In addition, while the drying operation of the internal heat exchanger is performed in the process (c), when the electric vehicle air conditioning system is changed to a defrost mode or the cooling mode by a manipulation of a user or a set condition, or when the air conditioning system is turned off, the drying operation of the internal heat exchanger may be stopped.

In addition, when a battery reset is performed, the electric vehicle air conditioning system may enter the internal heat exchanger dry mode in the process (c) and the drying operation of the internal heat exchanger may be performed.

In addition, the control method may further include (e) determining whether a position change to the heating mode occurs while the current air conditioning mode is confirmed that the current air conditioning mode is set to the cooling mode and the electric vehicle air conditioning system is operated in a set normal cooling mode.

In this situation, in the process (e), whether the position change to the heating mode occurs may be determined on the basis of whether a position change of a 4-way valve occurs.

In addition, in the process (e), when it is determined that the position change to the heating mode occurs, the electric vehicle air conditioning system may enter the internal heat exchanger dry mode in the process (c) and the drying operation of the internal heat exchanger may be performed, and when it is determined that the position change to the heating mode does not occur, the set normal cooling mode may be performed.

Meanwhile, according to the present disclosure, there is provided an electric vehicle air conditioning system including: a compressor configured to compress and discharge a refrigerant; a 4-way valve configured to transfer the refrigerant discharged from the compressor to an external heat exchanger or an internal heat exchanger according to air conditioning modes; the external heat exchanger configured to heat exchange between the refrigerant transferred from the compressor or the internal heat exchanger and air outside a vehicle; the internal heat exchanger configured to heat exchange between the refrigerant transferred from the external heat exchanger and air supplied inside a HVAC module, or to heat exchange between the refrigerant transferred from the compressor and the air supplied inside the HVAC module; a heater core mounted around the internal heat exchanger and supplied with a cooling water heated through a cooling water electric heater, the heater core being configured to heat air discharged through the internal heat exchanger; a blower fan mounted inside the HVAC module and configured to blow air to the internal heat exchanger; and a control unit configured to control the compressor, the cooling water electric heater, and the blower fan according to the air conditioning modes, wherein, in a situation in which a current air conditioning mode is set to a heating mode, when a request for entering an internal heat exchanger dry mode is received, the control unit performs control such that the electric vehicle air conditioning system enters the internal heat exchanger dry mode and a drying operation of the internal heat exchanger is performed, and when the drying operation of the internal heat exchanger is finished, the control unit performs control such that a normal heating mode is operated.

Here, after the entering of the internal heat exchanger dry mode, the control unit may perform control such that the heater core and the blower fan inside the HVAC module are operated for a predetermined time in a first stage so that dehumidification of the internal heat exchanger and indoor heating are performed, and the control unit may perform control such that the compressor is operated at a set minimum RPM for a predetermined time in a second stage so that residual moisture of the internal heat exchanger is removed.

In addition, while the drying operation of the internal heat exchanger is performed, when the electric vehicle air conditioning system is changed to a defrost mode or a cooling mode by a manipulation of a user or a set condition, or when the air conditioning system is turned off, the control unit may perform control such that the drying operation of the internal heat exchanger is stopped.

In addition, when a battery reset is performed, the control unit may perform control such that the electric vehicle air conditioning system enters the internal heat exchanger dry mode and the drying operation of the internal heat exchanger is performed.

In addition, when it is determined that a position change from a cooling mode to the heating mode occurs, the control unit may perform control such that the electric vehicle air conditioning system enters the internal heat exchanger dry mode and the drying operation of the internal heat exchanger is performed, and when it is determined that the position change from the cooling mode to the heating mode does not occur, a set normal cooling mode may be performed.

Advantageous Effects

According to the electric vehicle air conditioning system and the control method therefor of the present disclosure, when the air conditioning system is operated in the cooling mode and then is switched to the heating mode, the air conditioning system enters the internal heat exchanger dry mode before entering the heating mode. Furthermore, the dehumidification of the internal heat exchanger and the indoor heating are performed for a predetermined time only with the blower fan and the cooling water heater as a first stage, and the heat pump is operated at a minimum RPM for a predetermined time as a second stage so that residual moisture in the internal heat exchanger is completely removed, so that the flash fogging phenomenon that occurs on the windshield of the vehicle when the air conditioning system is changed from the cooling mode to the heating mode may be prevented, thereby being capable of realizing an effect of providing safety while the vehicle is driven.

In addition, due to the flash fogging phenomenon occurring on the windshield, since a modified heat pump system in which a 3-way valve is used instead of the 4-way valve is applied to a vehicle conventionally, a dedicated part for using the 3-way valve is required to be added, and the quantity of valves used in the heat pump is relatively increased, so that the configuration of the heat pump system is complicated and the mass production cost is increased. However, by applying the air conditioning system and the control method of the present disclosure, a heat pump system in which the 4-way valve is applied that was difficult to be applied to an existing vehicle heat pump system is capable of being mass-produced. Furthermore, since the heat pump system applies the 4-way valve and is configured as a simple structure, a layout freedom according to mounting the heat pump system inside the vehicle may be increased. Furthermore, there is an advantage that the mass production cost of the vehicle can be reduced by reducing the number of parts mounted in the heat pump system.

In addition, in some vehicles in which existing heat pump system is mounted, since an air conditioning system of the existing heat pump system is configured to always enter an internal heat exchanger dry mode whenever the air conditioning system is turned off, the air conditioning power consumption according to a domestic electric vehicle low-temperature driving distance certification test was as high as 6.819 kwh. However, when the control logic for preventing flash fogging of the present disclosure is used, the drying operation of the internal heat exchanger can be performed by selectively entering the internal heat exchanger dry mode according to the determination condition, so that the air conditioning power consumption according to the domestic electric vehicle low-temperature driving distance certification test is reduced to about 5.111 kwh, thereby being capable of realizing an effect of reducing power consumption of about 25%.

MODE FOR INVENTION

Figure 1:
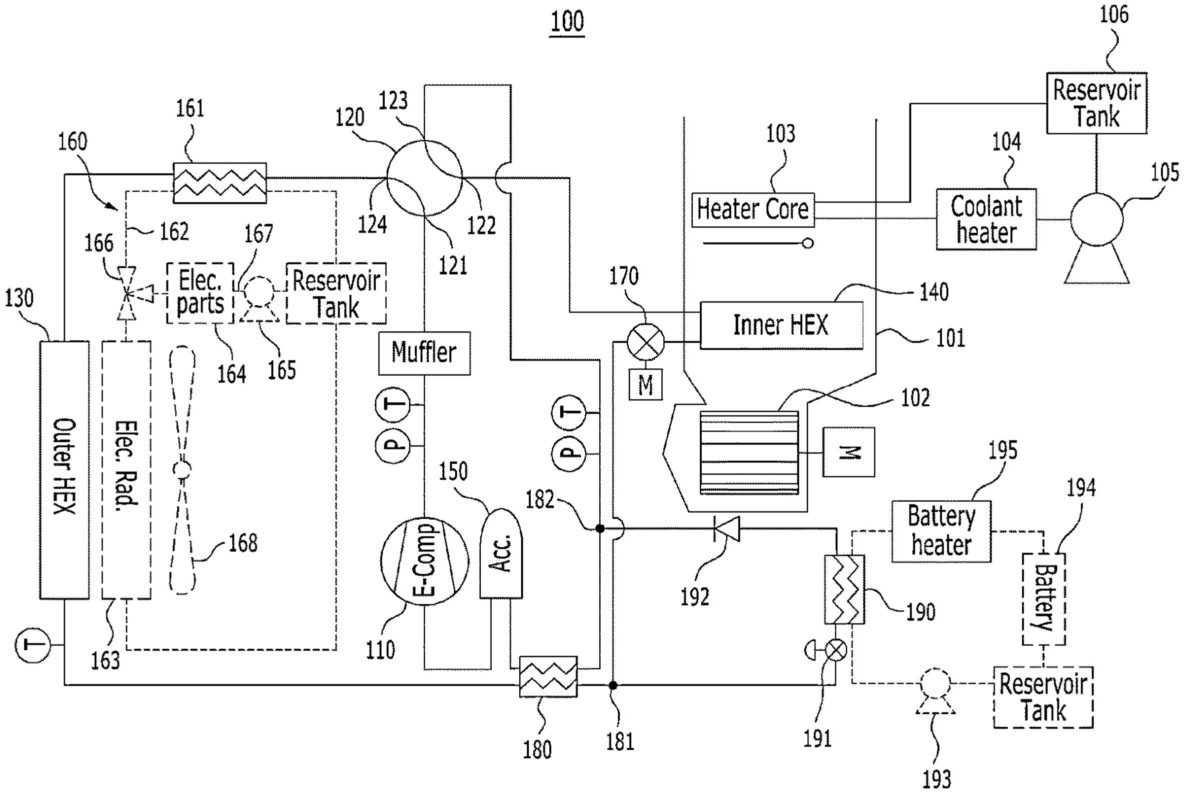
FIG. 1 is a configuration diagram illustrating a configuration of an electric vehicle air conditioning system according to the present disclosure.

Hereinafter, an embodiment of the present disclosure will be described in detail with reference to the accompanying drawings so that those skilled in the art can easily implement the present disclosure.

However, the present disclosure is not limited to the embodiment described herein, and may be embodied in many different forms. In addition, it should be noted that parts denoted by the same reference numerals throughout the detailed description mean the same components.

Hereinafter, an electric vehicle air conditioning system according to an embodiment of the present disclosure and a control method therefor will be described in detail.

FIG. 1 is a configuration diagram illustrating an overall configuration of an electric vehicle air conditioning system according to an embodiment of the present disclosure.

Referring to FIG. 1, an electric vehicle air conditioning system 100 according to an embodiment of the present disclosure includes a compressor 110, a 4-way valve 120, an external heat exchanger 130, an internal heat exchanger 140, an electronic part cooling circuit part 160, a first expansion valve 170, a battery chiller 190, a second expansion valve 191 that are disposed at specific positions and perform specific functions, and a control unit (an Electric HVAC vehicle control unit, EHVCU) configured to control the compressor 110, the 4-way valve 120, a cooling water electric heater 104, and the first and second expansion valves 170 and the 191, respectively, according to air conditioning modes.

The compressor 110 is configured to compress and discharge a refrigerant, and an electric compressor capable of performing a Proportional Integral Differential (PID) control on an RPM of the compressor 110 through the control unit is provided.

In such a compressor 110, when an indoor temperature adjustment is performed by a user, the control unit sets a temperature around the internal heat exchanger 140 to a target temperature, and performs the PID control on the compressor 110 by applying a feedback control until a temperature difference between the set target temperature and the current temperature around the internal heat exchanger 140 measured from a temperature sensor converges within a preset error range, thereby being capable of performing an indoor cooling or an indoor heating.

The 4-way valve 120 is configured to transfer the refrigerant discharged from the compressor 110 to the external heat exchanger 130 or to the internal heat exchanger 140 according to the air conditioning modes, and is capable of guiding a flow of the refrigerant in a specific direction by the control of the control unit.

The external heat exchanger 130 has a function of heat-exchanging between the refrigerant transferred from the compressor 110 or the internal heat exchanger 140 and air outside a vehicle. The internal heat exchanger 140 has a function of heat-exchanging between the refrigerant transferred from the external heat exchanger 130 and air supplied to an indoor where a passenger is located, or the internal heat exchanger 140 has a function of heat-exchanging between the refrigerant discharged from the compressor 110 and the air supplied to the interior.

The first expansion valve 170 is disposed on a refrigerant line which is inserted into the internal heat exchanger 140 or which is discharged from the internal heat exchanger 140, and is operated according to a control signal transmitted from the control unit, thereby being capable of expanding the refrigerant. At this time, an Electronic Expansion Valve (EEV) capable of adjusting the opening degree by the PID control may be used as the first expansion valve 170.

The electronic part cooling circuit part 160 is mounted adjacent to the external heat exchanger 130, and serves to absorb heat generated from the electronic parts mounted in the vehicle and to discharge the heat to the outside according to the air conditioning modes.

The electronic part cooling circuit part 160 is provided with a refrigerant/electronic part cooling water heat exchanger 161 which is mounted between the external heat exchanger 130 and the 4-way valve 120 and which is configured to heat-exchange between the refrigerant discharged from the external heat exchanger 130 and a cooling water that flows along the electronic part cooling water flow path 162.

The electronic part cooling water flow path 162 forms one cooling water flow passage connecting the refrigerant/electronic part cooling water heat exchanger 161 and an electronic part radiator 163 to each other, an electronic part cooling means 164 configured to absorb heat generated from the electronic parts mounted in the vehicle and an electronic part cooling water circulation pump 165 configured to generate a one-way flow of the cooling water are mounted on the electronic part cooling water flow path 162, and a 3-way valve 166 for cooling the electronic parts is mounted on an intersection point between the electronic part cooling water flow path 162 and an electronic part cooling water bypass flow path 167.

In addition, the electronic part radiator 163 is mounted adjacent to the external heat exchanger 130 and discharges heat of the cooling water that flows through the electronic part cooling water flow path 162. At this time, according to situations, heat generated from the electronic parts mounted in the vehicle may be absorbed by using the electronic part cooling circuit part 160, and the heat may be discharged only to the electronic part radiator 163. Furthermore, a separate cooling fan 168 may be mounted so that heat dissipation is promoted.

Meanwhile, the 4-way valve 120 that guides the flow of the refrigerant in the specific direction includes a first port 121, a second port 122, a third port 123, and a fourth port 124.

Specifically, the first port 121 of the 4-way valve is a refrigerant inlet port into which the refrigerant discharged from the compressor 120 is always introduced regardless of the air conditioning modes. The second port 122 is a refrigerant inlet and outlet port selectively in communication with the first port 121 or the third port 123 according to the air conditioning modes, and is connected to the internal heat exchanger 140 disposed inside an HVAC module 101.

In addition, the third port 123 of the 4-way valve is a refrigerant outlet port selectively in communication with the second port 122 or the fourth port 124 according to the air conditioning modes, and is connected to an intermediate heat exchanger 180 that is disposed in front of the compressor 110 according to the flow of the refrigerant.

In addition, the fourth port 122 of the 4-way valve is a refrigerant inlet and outlet port selectively in communication with the first port 121 or the third port 123 according to the air conditioning modes, and is connected to the refrigerant/electronic part cooling water heat exchanger 111 of the electronic part cooling circuit part.

In addition, in each of the ports of the 4-way valve, when the first port 121 is in communication with the second port 122, the third port 123 is in communication with the fourth port 124. Furthermore, when the first port 121 is in communication with the fourth port 124, the second port 122 is in communication with the third port 123.

Accordingly, when the first port 121 of the 4-way valve is in communication with the fourth port 124, the refrigerant discharged from the compressor 110 is transferred to the refrigerant/electronic part cooling water heat exchanger 161 of the electronic part cooling circuit part 160. When the fourth port 124 is in communication with the third port 123, the refrigerant that has passed through the refrigerant/electronic part cooling water heat exchanger 161 of the electronic part cooling circuit part is transferred to the intermediate heat exchanger 180 disposed in front of the compressor 110 according to the flow of the refrigerant.

Meanwhile, a first branch point 181 in which the refrigerant discharged from the external heat exchanger 130 is branched or joined is provided on the refrigerant line connecting a space between the external heat exchanger 130 and the internal heat exchanger 140, and a second branch point 182 in which the refrigerant that has passed through the 4-way valve 120 is branched or joined is provided on the refrigerant line connecting a space between the third port 123 and the compressor 110.

At this time, it is preferable that the second branch point 182 is positioned at a position before the intermediate heat exchanger 180 so that the overheating degree of the refrigerant and the performance of the refrigerant that is discharged from the battery chiller 190 is capable of being further increased.

In addition, the battery chiller 190 is mounted on a separate refrigerant branch line connecting the first branch point 181 and the second branch point 182 to each other. According to the air conditioning modes, a battery may be cooled by introducing the refrigerant discharged from the external heat exchanger 130 into the second expansion valve 191 such that heat exchange is realized in the battery chiller 190.

In this situation, as the second expansion valve 191 mounted on the battery chiller 190, a solenoid type expansion valve in which only an on/off opening and closing operation is capable of being performed and the opening degree is not capable of being adjusted may be used, or an Electronic Expansion Valve (EEV) capable of adjusting the opening degree by the PID control, such as the first expansion valve 170, may be used. In addition, a check valve 192 for preventing backflow of the refrigerant may be mounted on a pipe line at an outlet side of the battery chiller 190 to which the refrigerant is discharged.

The intermediate heat exchanger 180 is a configuration abbreviated as IHX, and is provided for realizing heat exchange between the refrigerant before passing through the first expansion valve 170 and the internal heat exchanger 140 and the refrigerant after passing through the first expansion valve 170 and the internal heat exchanger 140.

The intermediate heat exchanger 180 is mounted between the external heat exchanger 130 and the first branch point 181 of the refrigerant line connecting the space between the external heat exchanger 130 and the internal heat exchanger 140. According to the air conditioning modes, the intermediate heat exchanger 180 exchanges heat of the refrigerant discharged from the external heat exchanger 130 and then transfers the refrigerant to the internal heat exchanger 140, or exchanges heat of the refrigerant discharged from the internal heat exchanger 140 and then transfers the refrigerant to the external heat exchanger 130.

In this situation, the intermediate heat exchanger 180 may be configured as a double tube type heat exchanger including an external pipe conduit transferring the refrigerant toward the first expansion valve 170 and an internal pipe conduit transferring the refrigerant toward the accumulator 150 and the compressor 110. Here, a refrigerant having a relatively high pressure and having a relatively high temperature may flow in the external pipe conduit connected to the first expansion valve 170, and a refrigerant having a relatively low pressure and having a relatively low temperature may flow in the internal pipe conduit.

Meanwhile, a heater core 103 into which the cooling water heated by the cooling water electric heater 104 is introduced is mounted inside the HVAC module 101. The heater core 103 is mounted inside a flow path of air supplied to the interior of the vehicle. Furthermore, when the air conditioning mode is in a heating mode, a dehumidification mode, or a defrosting mode, the heater core 103 heats the air supplied to the interior of the vehicle, and a temperature of the cooling water supplied to the heater core 103 may be controlled by PID control of the cooling water electric heater 104 by the control unit. In addition, a blower fan 102 which is controlled by the control unit and which is capable of blowing air to the internal heat exchanger 140 is mounted inside the HVAC module 101.

The electronic part cooling circuit part 160 is controlled such that the electronic part cooling circuit part 160 is operated when an air conditioning mode of a heat pump system is in a heating mode or a cooling mode. Furthermore, the refrigerant/electronic part cooling water heat exchanger 161 is operated as a water-cooled type condenser by using the electronic part cooling water in the cooling mode, and is operated as an evaporator absorbing heat generated from the electronic parts in the heating mode.

Meanwhile, when the air conditioning system 100 is operated in the cooling mode, the control unit may perform the PID control on the compressor 110 until the difference between a target evaporative temperature and a current evaporative temperature according to the user's temperature setting converges to an error range.

That is, when the air conditioning system 100 is operated in the cooling mode, the internal heat exchanger 140 functions as an evaporator. Furthermore, the control unit is configured to set the temperature of the internal heat exchanger 140, which functions as the evaporator, to the target evaporative temperature, and is configured to perform the PID control on the RPM of the compressor 110 until the difference between the current evaporative temperature detected through a temperature sensor (not illustrated) mounted around the internal heat exchanger 140 and the target evaporative temperature converges to the error range that is preset, thereby being capable of performing the indoor cooling.

Conversely, when the air conditioning system 100 is operated in the heating mode, the internal heat exchanger 140 functions as a condenser. Furthermore, the control unit is configured to set the temperature of the internal heat exchanger 140 that functions as the condenser to the target temperature, and is configured to perform the PID control on the RPM of the compressor 110 until the difference between the current temperature of the internal heat exchanger 140 detected through the temperature sensor and the target temperature converges to the error range that is preset, thereby being capable of performing the indoor heating.

Hereinafter, each air conditioning mode of the electric vehicle air conditioning system according to the present disclosure will be described in detail.

Figure 2:
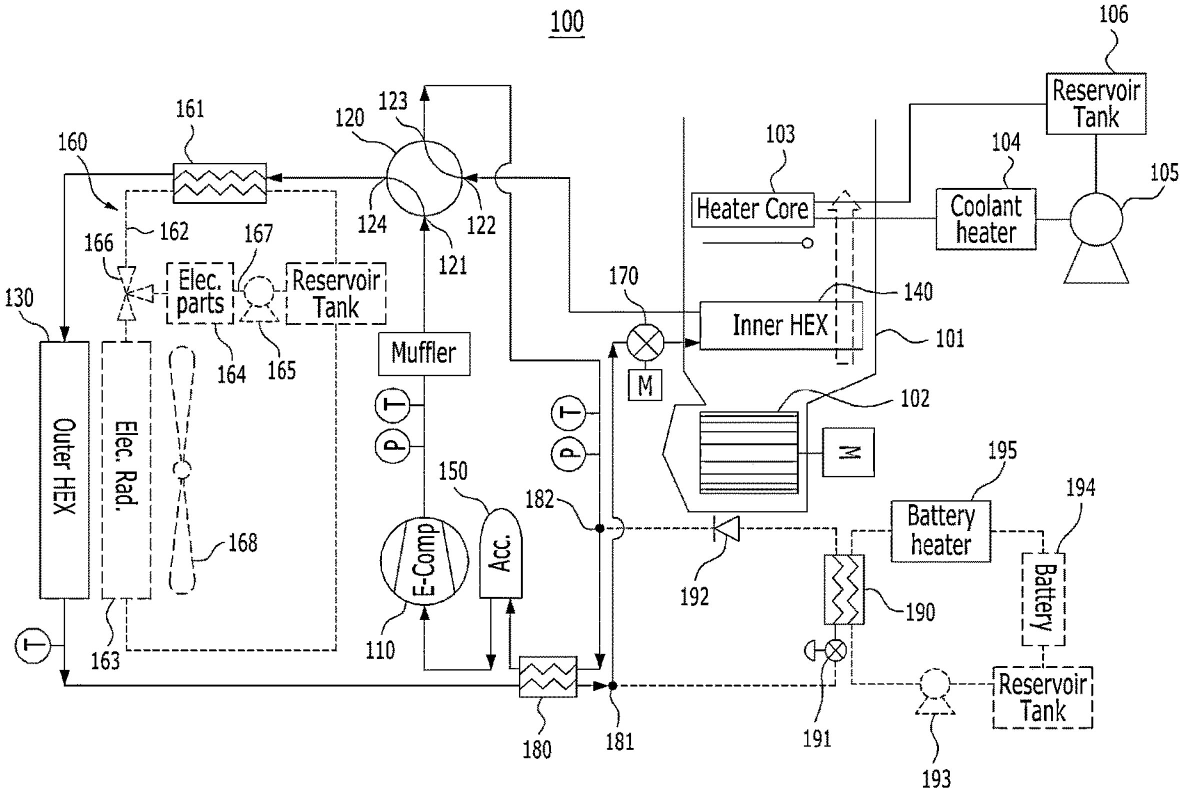
FIG. 2 is a schematic view illustrating a flow of a refrigerant when the air conditioning system is operated in a cooling mode.
Figure 3:
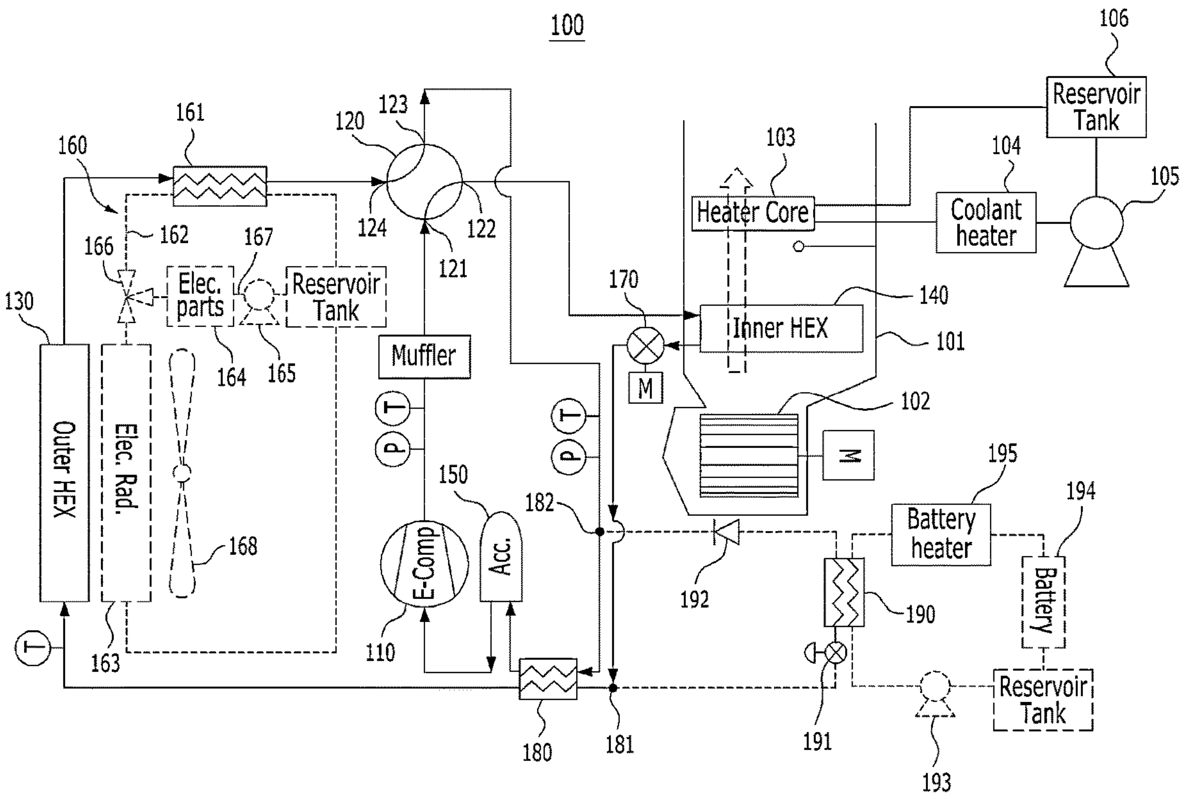
FIG. 3 is a schematic view illustrating a flow of the refrigerant when the air conditioning system is operated in a heating mode.
Figure 4:
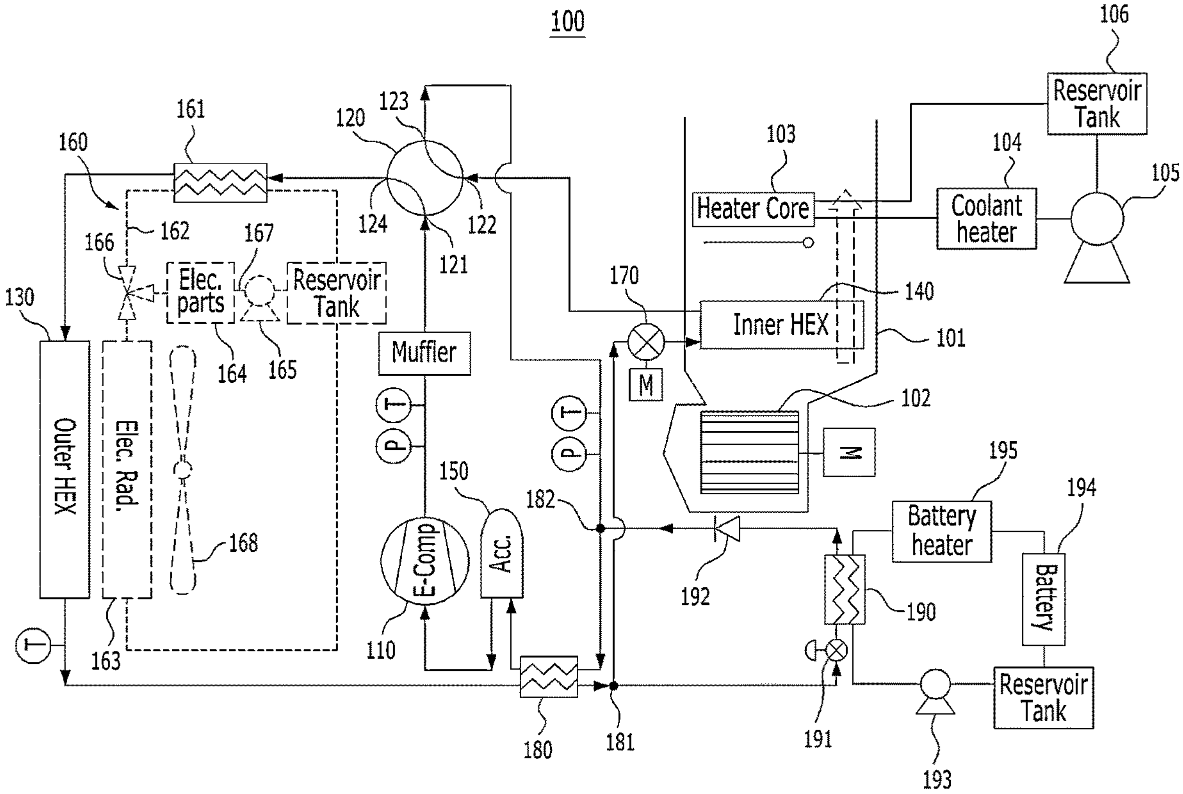
FIG. 4 is a schematic view illustrating a flow of the refrigerant when the air conditioning system is operated in the cooling mode and a battery cooling mode simultaneously.

In FIG. 2 to FIG. 4, refrigerant circulation flowcharts illustrating each refrigerant flow in the cooling mode, the heating mode, and the cooling and battery cooling modes of the electric vehicle air conditioning system according to an embodiment of the present disclosure are illustrated.

First, the case of the cooling mode illustrated in FIG. 2 will be described.

In the cooling mode, the flow of the refrigerant is controlled such that the refrigerant flows in the following order: "the compressor 110-the 4-way valve 120-the electronic part cooling circuit part 160 (the refrigerant/electronic part cooling water heat exchanger 161 functions as a water-cooled type condenser)-the external heat exchanger 130 (the external heat exchanger 130 functions as a condenser)-the intermediate heat exchanger 180, the internal heat exchanger 140 (the internal heat exchanger 140 function as an evaporator)-the 4-way valve 120, the accumulator 150, and the compressor 110."

In the cooling mode, the 4-way valve 120 is configured such that the first port 121 of the 4-way valve 120 is in communication with the fourth port 124 and the second port 122 is in communication with the third port 123 so that the refrigerant discharged from the compressor 110 is introduced into the external heat exchanger 130 and the refrigerant discharged from the internal heat exchanger 140 is introduced into the compressor 110.

In addition, according to the air conditioning modes, the internal heat exchanger 140 may perform heat exchange between the refrigerant transferred from the external heat exchanger 130 and air supplied to the interior of the vehicle, or heat exchanges between the refrigerant discharged from the compressor 110 and the air supplied to the interior of the vehicle.

Specifically, according to the air conditioning modes, one port of the internal heat exchanger 140 functions as a passage through which the refrigerant that has absorbed heat from the air introduced inside the HVAC module is discharged, or functions as a passage into which the refrigerant for providing heat to the air supplied into the interior of the vehicle is introduced. Furthermore, according to the air conditioning modes, the other port of the internal heat exchanger 140 functions as a passage into which the refrigerant absorbing heat from the air that is introduced inside the HVAC module 101, or functions as a passage through which the refrigerant that has provided heat to the air supplied to the interior of the vehicle is discharged.

Here, when the air conditioning mode is operated in the cooling mode, the internal heat exchanger 140 functions as an evaporator. Furthermore, the refrigerant transferred from the external heat exchanger 130 expands in the first expansion valve 170, is introduced into the internal heat exchanger 140 in a low temperature state, and then heat exchange between the refrigerant and the air that is supplied to the interior of the vehicle is realized.

The accumulator 150 is mounted between the intermediate heat exchanger 180 and the compressor 110, and absorbs the refrigerant discharged from the internal heat exchanger 140 through the 4-way valve 120 and then transfers the refrigerant to the compressor 110.

In addition, the electronic part cooling circuit part 160 may be operated when the air conditioning mode is in the cooling mode. In this case, the refrigerant/electronic part cooling water heat exchanger 161 is operated as a water-cooled condenser by using the electronic part cooling water, so that the refrigerant inside the refrigerant/electronic part cooling water heat exchanger 161 may be further cooled, thereby being capable of increasing the cooling performance.

Here, the cooling mode illustrated in FIG. 2 is an operation mode in an outside temperature condition in which battery cooling is not required. Furthermore, the second expansion valve 191 is closed so that the battery cooling flow path that branches the refrigerant line at the outlet side of the intermediate heat exchanger 180 is not opened, so that the refrigerant does not flow to the battery chiller 190.

Next, referring to FIG. 3, the heating mode of the present disclosure will be described.

In the heating mode, the flow of the refrigerant may be controlled such that the refrigerant flows in the following order: "the compressor 110-the 4-way valve 120-the internal heat exchanger 140 (the internal heat exchanger 140 functions as a condenser)-the external heat exchanger 130 (the external heat exchanger 130 functions as an evaporator)-the electronic part cooling circuit part 160 (the refrigerant/electronic part cooling water heat exchanger 161 functions as an evaporator)-the 4-way valve 120-the accumulator 150-the compressor 110."

The 4-way valve 120 is configured such that the first port 121 is in communication with the second port 122 and the third port 123 is in communication with the fourth port 124 so that the refrigerant discharged from the compressor 110 is introduced into the internal heat exchanger 140 and the refrigerant discharged from the external heat exchanger 130 is introduced into the compressor 110.

As such, when the heating mode is operated, the internal heat exchanger 140 functions as a condenser. Therefore, in order for the refrigerant discharged from the compressor 110 to be condensed and then to be exchange heat with the air supplied to the interior of the vehicle, the refrigerant discharged from the compressor 110 is introduced inside the internal heat exchanger 140.

In addition, the heating performance may be increased by operating the cooling water electric heater 104 so that heat is applied to the air supplied to the interior of the vehicle. At this time, as illustrated in FIG. 3, the heater core 103 is disposed in the HVAC module 101, a cooling water line that circulates the heater core 103 is provided, and the cooling water electric heater 104, a pump 105, and a cooling water reservoir tank 106 may be disposed on the cooling water line.

In this case, the accumulator 150 may absorb the refrigerant discharged from the electronic part cooling circuit part 160 through the 4-way valve 120, and then may transfer the refrigerant to the compressor 110. In addition, in the electronic part cooling circuit part 160, the refrigerant discharged from the external heat exchanger 130 absorbs heat generated from the electronic parts mounted in the vehicle by performing heat exchange, and the refrigerant that has absorbed heat may be transferred to the accumulator 150 through the 4-way valve 120.

Such a heating mode is operated in a winter season when the outdoor temperature is low. Therefore, in the general case, the battery is not required to be cooled, so that the second expansion valve 191 is closed so that the refrigerant does not flow toward the battery chiller 190.

At this time, when the battery cooling is required due to an abnormality of the battery or an abnormality of the surrounding area, the mode is switched to the battery cooling mode that performs only a battery cooling operation, and the heating may be performed only by the cooling water electric heater 104.

In addition, when the vehicle is driving, heat is generated in the electronic parts. Furthermore, when the refrigerant is introduced into the electronic part cooling circuit part 160, the refrigerant/cooling water heat exchanger 161 of the electronic part cooling circuit part 160 functions as an evaporator, so that the refrigerant absorbs heat generated in the electronic parts and reaches a relatively higher temperature state and then the refrigerant is introduced into the accumulator 150 and the compressor. Therefore, the amount of heat generated in the internal heat exchanger 140 is increased, so that the heating performance may be further increased.

Next, referring to FIG. 4, a case in which the cooling mode and the battery cooling mode of the air conditioning system according to the present disclosure are simultaneously performed will be described.

When the cooling mode and the battery cooling mode are simultaneously performed, the flow of the refrigerant may be controlled such that the refrigerant flows in the following order: "the compressor 110-the 4-way valve 120-the electronic part cooling circuit part 160 (the refrigerant/electronic part cooling water heat exchanger 161 functions as a water-cooled condenser)-the external heat exchanger 130 (the external heat exchanger 130 functions as a condenser)-the intermediate heat exchanger 180-the internal heat exchanger 140 (the internal heat exchanger 140 functions as an evaporator)-the 4-way valve 120-the accumulator 150, the compressor 110", and the refrigerant line connecting a space between the intermediate heat exchanger 180 and the internal heat exchanger 140 may be branched so that some of the refrigerant that is branched passes through the second expansion valve 191 and then is introduced into the battery chiller 190, thereby being capable of cooling the battery.

Here, when the air conditioning system is operated in the cooling mode, the internal heat exchanger 140 functions as an evaporator, and the refrigerant transferred from the external heat exchanger 130 expands through the first expansion valve 170, and then the refrigerant is introduced inside the internal heat exchanger 140 and heat exchange between the refrigerant and the air that is supplied to the interior of the vehicle is realized.

In addition, the accumulator 150 mounted between the intermediate heat exchanger 180 and the compressor 110 receives the refrigerant discharged from the internal heat exchanger 140 through the 4-way valve 120, and then transmits the refrigerant to the compressor 110 again.

Meanwhile, after the refrigerant discharged from the external heat exchanger 130 expands through the second expansion valve 191 and reaches a low temperature state, the refrigerant is introduced into the battery chiller 190 and exchanges heat with the cooling water circulating through the battery 194, thereby cooling the battery 194.

In this case, in a cooling water circuit for a battery cooling and heating, which exchanges heat with the battery chiller 190, a cooling water circulation pump 193, the battery 194, and a battery heater 195 are sequentially disposed and the circulation of the cooling water is realized, and the battery chiller 190 functions as an evaporator.

As described above, the refrigerant condensed while passing through the external heat exchanger 130 expands through the first expansion valve 170 and the second expansion valve 191, and is introduced into the internal heat exchanger 140 and the battery chiller 190 as a low temperature refrigerant, so that the refrigerant is capable of cooling the air introduced into the HVAC module 101 so as to perform the indoor cooling and the refrigerant is also capable of cooling the battery 194 by a heat exchange action of the low temperature refrigerant introduced into the battery chiller 190. In addition, the refrigerant in which heat exchange is performed in the battery chiller 190 joins the refrigerant that has passed through the internal heat exchanger 140 and the 4-way valve 120 at the second branch point 182, and is introduced into the intermediate heat exchanger 181.

As such, the cooling mode is normally operated in a summer season when the outdoor temperature is usually high. Therefore, since the battery efficiency is reduced due to the increase in the temperature of the battery 194, the second expansion valve 191 is opened so that the refrigerant flows and expands. Furthermore, as the expanded refrigerant passes through the battery chiller 190 that functions as an evaporator, the refrigerant cools the cooling water of the cooling water circuit for the battery cooling and heating, and the refrigerant is circulated to a cooling plate of a battery pack, thereby being capable of preventing the battery pack from overheating.

Figure 5:
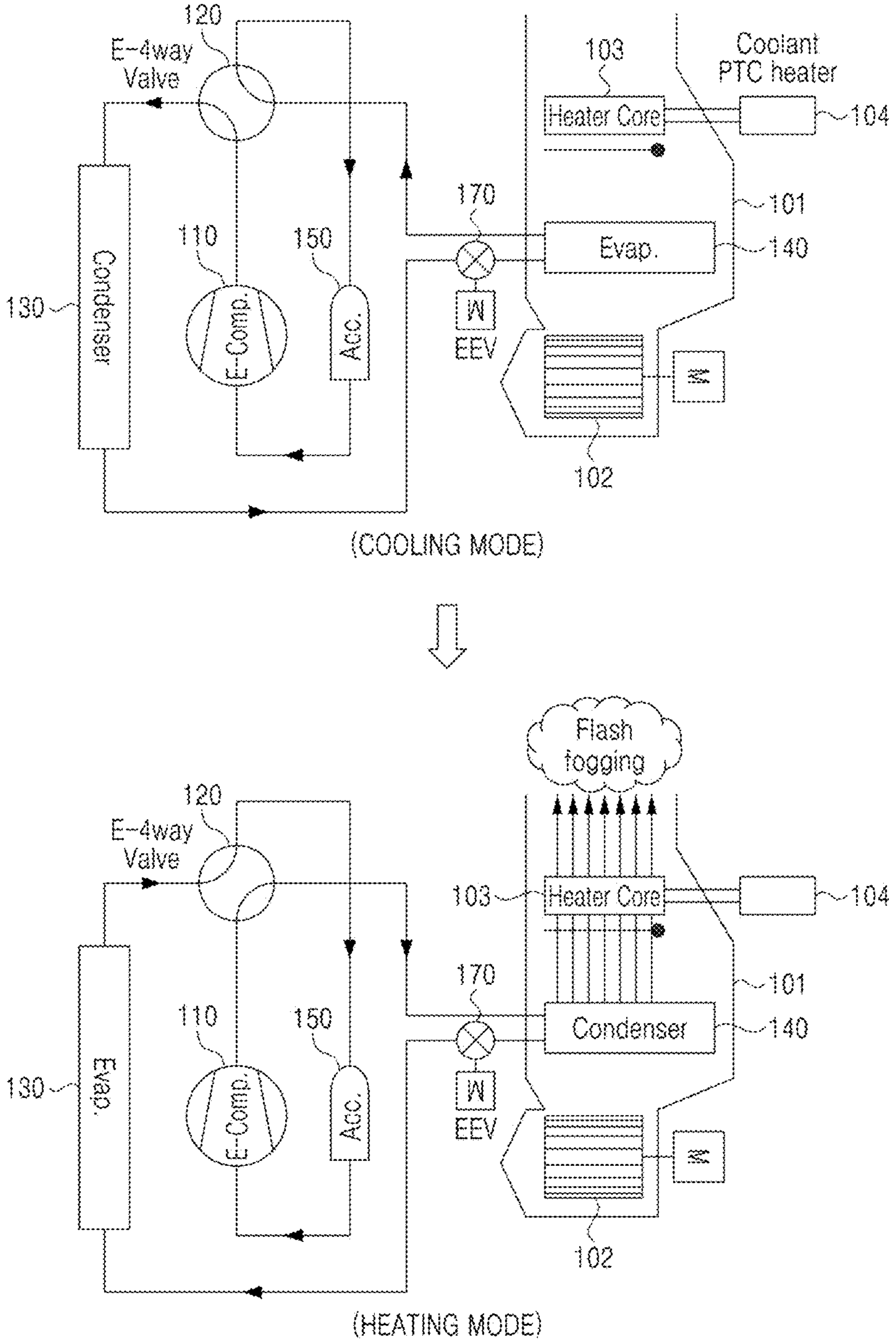
FIG. 5 is a conceptual view illustrating a flash fogging phenomenon that occurs when the air conditioning system is operated in the cooling mode and then is operated in the heating mode.

Meanwhile, FIG. 5 is a view schematically illustrating a flash fogging phenomenon that occurs when the air conditioning system (the heat pump system) of the present disclosure in which the 4-way valve is applied is changed from a cooling mode to a heating mode.

As illustrated in FIG. 5, in the air conditioning system 100 of the present disclosure configuring the heat pump system by applying the 4-way valve 120, when the air conditioning system 100 is operated in the cooling mode, the external heat exchanger 130 functions as a condenser, and the internal heat exchanger 140 functions as an evaporator. Conversely, when the air conditioning system 100 is operated in the heating mode, the external heat exchanger 130 functions as an evaporator, and the internal heat exchanger 140 functions as a condenser.

However, while the air conditioning system 100 is operated in the cooling mode, when the setting is changed to a user heating mode or the setting is changed to the heating mode according to an operating condition set in the control unit, the internal heat exchanger 140 that was functioning as an evaporator in the cooling mode is suddenly changed to perform a condenser function in the heating mode, so that water droplets (moisture) stored in the internal heat exchanger 140 when the internal heat exchanger 140 is in a state in which the internal heat exchanger 140 functions as an evaporator rapidly evaporate, thereby occurring the flash fogging phenomenon in which the water droplets form like a fog on a windshield of the vehicle. This phenomenon may occur a risk of causing a safety accident while a vehicle driver is driving the vehicle since the flash fogging phenomenon blocks the visibility of the vehicle driver, and is also a main reason that a heat pump system that has a 4-way valve applied to an existing vehicle has not been used.

In the present disclosure, in order to solve the flash fogging phenomenon that occurs in the heat pump system in which the 4-way valve is applied, when the air conditioning system 100 is switched to the heating mode by a user's setting or by other set operation conditions while the air conditioning system 100 is operated in the cooling mode, the air conditioning system 100 may enter an internal heat exchanger dry mode (Inner HEX dry mode) that is a separate set mode before the heating mode is fully operated, and an operation of drying moisture contained in the internal heat exchanger 140 may be performed.

Figure 6:
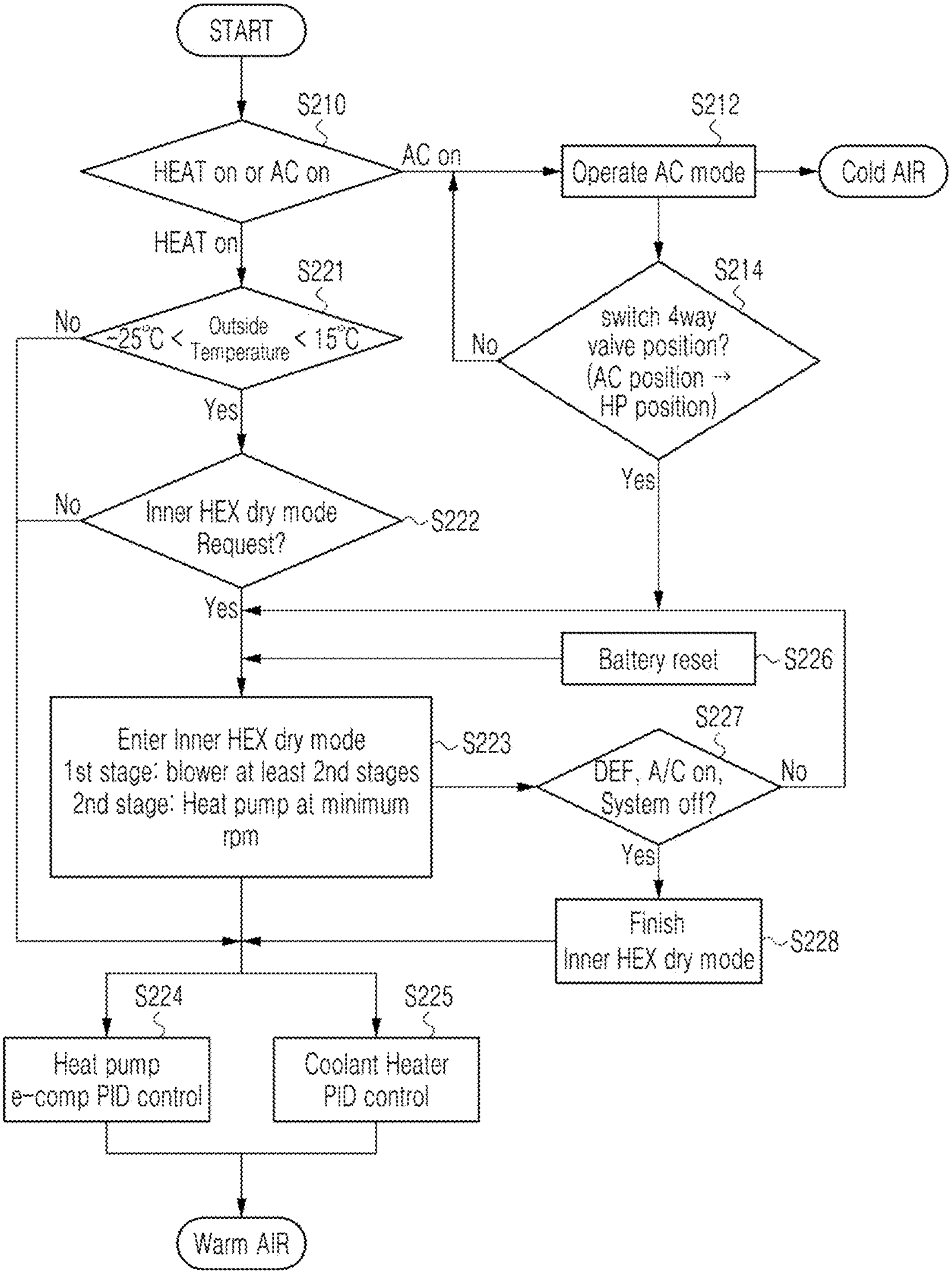
FIG. 6 is a flowchart illustrating a control method for an air conditioning system according to the present disclosure.

FIG. 6 is a flowchart illustrating a control logic for preventing flash fogging in the air conditioning system of the present disclosure.

Referring to FIG. 6, firstly, in a control logic for preventing flash fogging of the air conditioning system according to the present disclosure, whether a current air conditioning mode is set to the cooling mode (AC ON) or the heating mode (HEAT ON). S210

Here, when it is confirmed that the current air conditioning mode is set to the heating mode, whether an outside air temperature of the vehicle exists within a set temperature range is determined. S221

At this time, the set temperature range is an outside air temperature range that is a condition for entering the internal heat exchanger dry mode (Inner HEX dry mode). For example, the outside air temperature range may be higher than a −25 degrees Celsius and lower than a 15 degrees Celsius.

In addition, when it is confirmed that the current outside air temperature of the vehicle exists within the set temperature range, next, whether a request for entering the internal heat exchanger dry mode is received is determined. S222

In this case, when a position of the air conditioning mode is switched from the cooling mode to the heating mode or when a reset of the battery that is a driving source of an electric vehicle is performed, the request for entering the internal heat exchanger dry mode may be received before the process of fully operating the mode of the air conditioning system 100 in the heating mode.

At this time, when it is determined that the current outside air temperature of the vehicle does not exist within the set temperature range in the S221 process or when it is determined that the request for entering the internal heat exchanger dry mode is not received in the S222 process, a normal heating mode operation for the indoor heating may be performed under an operation condition set in the heat pump system. S224 and S225

Next, when it is confirmed that the request for entering the internal heat exchanger dry mode is received in the S222 process, a drying operation of the internal heat exchanger 140 is performed during a set time by entering the internal heat exchanger dry mode. S223

At this time, the internal heat exchanger drying operation performed after entering the internal heat exchanger dry mode may, for example, operate the cooling water electric heater 104 in a first stage, thereby dehumidifying the internal heat exchanger 140 and performing the indoor heating for a predetermined time through the heater core 103 positioned inside the HVAC module 101. In this case, along with dehumidifying the internal heat exchanger 140 by the heater core 103, the blower fan 102 provided inside the HVAC module 101 may be driven to at least two stages, thereby being capable of assisting the dehumidification operation of the internal heat exchanger 140. Then, in a second stage, the compressor 110 operated in the heat pump system (heating mode) may be operated at a minimum RPM for a predetermined time, thereby being capable of removing residual moisture of the internal heat exchanger 140. S223

In addition, when the internal heat exchanger drying operation in the S223 process is finished, the heat pump system is operated in the set normal heating mode. S224 and S225

Meanwhile, when it is confirmed that the current air conditioning mode is set to the cooling mode in the S210 process, the indoor cooling may be performed by operating the air conditioning mode in the normal cooling mode according to the set cooling mode operation condition. S212

At this time, the control unit determines whether a position change to the heating mode occurs while the air conditioning mode is operated in the indoor cooling mode S214.

When it is confirmed that the position change to the heating mode has occurred, the drying operation of the internal heat exchanger 140 may be performed by entering the internal heat exchanger dry mode S223. When it is confirmed that the position change to the heating mode has not occurred, the set normal cooling mode may be operated. S212

In this case, in the S214 process, whether the position change from the cooling mode to the heating mode has occurred may be determined on the basis of whether a position change of the 4-way valve 120 has occurred.

On the other hand, regardless of a situation in which the position of the air conditioning mode is changed from the cooling mode to the heating mode, when a battery reset S226 of the vehicle is performed, dehumidification of the internal heat exchanger 140 may be performed by allowing the vehicle to immediately enter the internal heat exchanger dry mode in the S223 process.

In addition, as described above, while the air conditioning system 100 is operated in the internal heat exchanger dry mode, when the air conditioning mode is changed to a defrost (DEF) mode or the cooling mode (AC mode) or the operation of the air conditioning system 100 is turned off according to a manipulation of the user, the operation of the internal heat exchanger dry mode that is currently in progress may be stopped.

In addition, while the internal heat exchanger drying operation is performed in the S223 process, when air conditioning mode is changed to the defrost mode or the cooling mode or the operation of the air conditioning system 100 is turned off according to a manipulation of the user, the operation of the internal heat exchanger dry mode that is currently in progress may be stopped. S228.

As described above, when the air conditioning system 100 is changed from the cooling mode to the heating mode or when the battery reset is performed, the air conditioning system 100 enters the "internal heat exchanger dry mode" and naturally dries the internal heat exchanger 140 with only the heater core 103 for a predetermined time. After then, the compressor 110 is operated in the heating mode (heat pump mode) at a minimum RPM for a predetermined time, so that the operation of fully removing residual moisture of the internal heat exchanger 140 is performed for a predetermined time, thereby performing the drying operation to the internal heat exchanger 140. Furthermore, when the drying operation of the internal heat exchanger 140 is fully completed, the air conditioning mode is controlled so that the normal heating mode is operated, so that a phenomenon in which flash fogging occurs on the windshield of the vehicle may be effectively prevented, thereby being capable of providing the driving safety while the vehicle is driven.

In addition, in some vehicles in which existing heat pump system is mounted, since an air conditioning system of the existing heat pump system is configured to always enter an internal heat exchanger dry mode whenever the air conditioning system is turned off, the air conditioning power consumption according to a domestic electric vehicle low-temperature driving distance certification test was as high as 6.819 kwh. However, when the control logic for preventing flash fogging of the present disclosure is used, the drying operation of the internal heat exchanger can be performed by selectively entering the internal heat exchanger dry mode according to the determination condition, so that the air conditioning power consumption according to the domestic electric vehicle low-temperature driving distance certification test is reduced to about 5.111 kwh, thereby being capable of realizing a reduction in power consumption of about 25%.

Meanwhile, in the air conditioning system 100 of the present disclosure, when the air cooling mode and the battery cooling mode are simultaneously performed as illustrated in FIG. 4, the battery cooling may be performed simultaneously with the indoor cooling since the battery cooling request signal is received from a Battery Management System (BMS) when the battery 194 is overheated above a set temperature. That is, when the request for battery cooling is received from the BMS while the air conditioning system 100 is operated in the cooling mode, the control unit transmits a control signal so that the second expansion valve 191 positioned at the battery chiller 190 is opened and the refrigerant in the low temperature is supplied to the battery chiller 190, thereby performing the battery cooling by realizing the heat exchange action of the battery chiller 190.

At this time, in a situation in which the second expansion valve 191 positioned at the battery chiller 190 is used as an expansion valve that is a solenoid type, is capable of operating only on/off opening and closing operation, and is not an electronic expansion valve capable of adjusting the opening degree such as the first expansion valve 170, when the mode enters the battery cooling mode and the second expansion valve 191 is suddenly opened, some of the refrigerant supplied to the internal heat exchanger 140 from the external heat exchanger 130 is introduced toward the battery chiller 190, and the flow rate of the refrigerant moving toward the internal heat exchanger 140 is temporarily reduced, so that the indoor cooling performance may be temporarily reduced.

As such, while the air conditioning mode 100 is operated in the cooling mode, when the battery cooling request is received and the air conditioning mode 100 enters the battery cooling mode, the second expansion valve 191 is opened so as to cool the battery through the battery chiller 190. At the same time, in the current cooling mode, a specific compensating RPM value corresponding to a cooling load of the battery is added to the RPM value of the compressor 110 that is currently under PID control, so that the PID control of the compressor 110 is controlled for a predetermined time with a high power. Therefore, the amount of refrigerant moving toward the internal heat exchanger 140 may be increased for a predetermined time, so that the temporary decrease in the indoor cooling performance due to a sudden change in the refrigerant pass according to the opening of the second expansion valve 191 may be effectively compensated.

At this time, when air conditioning mode enters the battery cooling mode as described above, a predetermined compensation RPM value capable of compensating the cooling load of the battery 194 may be transmitted to the compressor 110 from the BMS, and the PID control of the compressor 110 may be performed at a high power for a predetermined time through the additional compensation RPM value.

In addition, when the cooling of the battery is finished, the control unit closes the second expansion valve 191 so that the refrigerant flow is again guided to the internal heat exchanger 140. In this case, the compressor 110 is operated at a high power while the specific compensation RPM value is applied in the battery cooling mode, so that the amount of the refrigerant may be continuously increased and the indoor cooling may be excessively performed.

Therefore, when the cooling of the battery is finished, the control unit controls that the PID control value of the compressor 110 that is under PID control with a high power is returned to an original state (a state of being operated in the cooling mode only) by applying a current compensation RPM value, so that the amount of the refrigerant moving toward the evaporator is reduced, thereby being capable of minimizing the sudden temperature decrease phenomenon of the indoor due to the return of the refrigerant path and being capable of reducing the power consumption due to high power operation of the compressor 110.

Although the exemplary embodiment of the present disclosure has been described, but the scope of the present disclosure is not limited to such a specific embodiment, and those skilled in the relevant field will be able to appropriately change the embodiment within the scope of the claims of the present disclosure.

DESCRIPTION OF REFERENCE NUMERALS

100: Air conditioning system 101: HVAC module
102: Blower fan 103: Heater core
104: Cooling water electric heater 110: Compressor
120: 4-way valve 130: External heat exchanger
140: Internal heat exchanger 150: Accumulator
160: Electronic part cooling circuit part 170: First expansion valve
180: Intermediate heat exchanger 190: Battery chiller
191: Second expansion valve 194: Battery

The invention claimed is:

1. A control method for an electric vehicle air conditioning system, the electric vehicle air conditioning system comprising:

a compressor configured to compress and discharge a refrigerant;

a 4-way valve configured to transfer the refrigerant discharged from the compressor to an external heat exchanger or an internal heat exchanger according to air conditioning modes;

the external heat exchanger configured to heat exchange between the refrigerant transferred from the compressor or the internal heat exchanger and air outside a vehicle;

the internal heat exchanger configured to heat exchange between the refrigerant transferred from the external heat exchanger and air supplied inside a HVAC module, or to heat exchange between the refrigerant transferred from the compressor and the air supplied inside the HVAC module;

a heater core mounted around the internal heat exchanger and supplied with a cooling water heated through a cooling water electric heater, the heater core being configured to heat air discharged through the internal heat exchanger;

a blower fan mounted inside the HVAC module and configured to blow air to the internal heat exchanger; and a controller configured to control the compressor, the cooling water electric heater, and the blower fan according to the air conditioning modes, the control method comprising:

(a) determining, by the controller, that a current air conditioning mode is set to a heating mode;

(b) determining, by the controller, that a request for entering an internal heat exchanger dry mode is received, while the current air conditioning mode is set to the heating mode;

(c) entering the internal heat exchanger dry mode and performing, by the heater core and the blower fan, a drying operation on the internal heat exchanger for a predetermined time in response to determining that the request for entering the internal heat exchanger dry mode is received; and (d) operating a set normal heating mode after the internal heat exchanger dry mode is finished.

2. The control method of claim 1, wherein, after the entering of the internal heat exchanger dry mode of the process (c), the heater core and the blower fan further performing indoor heating, and the compressor is operated at a set minimum RPM for a predetermined time to remove residual moisture of the internal heat exchanger.

3. The control method of claim 1, further comprising:

(a-1) determining whether an outside temperature exists within a set range when it is confirmed that the current air conditioning mode is set to the heating mode in the process (a).

4. The control method of claim 3, wherein, in the process (a-1), when the outside temperature exists within the set range, the electric vehicle air conditioning system enters the process (b) and whether the request for entering the internal heat exchanger dry mode is received is determined, and when the outside temperature does not exist within the set range, the electric vehicle air conditioning system enters the process (d) and the set normal heating mode is operated.

5. The control method of claim 1, wherein, while the drying operation on the internal heat exchanger is performed in the process (c), when the electric vehicle air conditioning system is changed to a defrost mode or the cooling mode by a manipulation of a user or a set condition, or when the air conditioning system is turned off, the drying operation on the internal heat exchanger is stopped.

6. The control method of claim 1, wherein, when a battery reset is performed, the electric vehicle air conditioning system enters the internal heat exchanger dry mode in the process (c) and the drying operation on the internal heat exchanger is performed.

7. The control method of claim 1, further comprising (e) determining whether a position change to the heating mode occurs while the current air conditioning mode is confirmed that the current air conditioning mode is set to the cooling mode and the electric vehicle air conditioning system is operated in a set normal cooling mode.

8. The control method of claim 7, wherein, in the process (e), whether the position change to the heating mode occurs is determined on the basis of whether a position change of the 4-way valve occurs.

9. The control method of claim 7, wherein, in the process (e), when it is determined that the position change to the heating mode occurs, the electric vehicle air conditioning system enters the internal heat exchanger dry mode in the process (c) and the drying operation on the internal heat exchanger is performed, and when it is determined that the position change to the heating mode does not occur, the set normal cooling mode is performed.

* * * * *